United States Patent [19]

Aly et al.

[11] Patent Number: 4,836,989
[45] Date of Patent: Jun. 6, 1989

[54] DISTRIBUTION SYSTEM FOR DOWNFLOW REACTORS

[75] Inventors: Fouad A. Aly, Newtown, Pa.; Richard G. Graven, Pennington, N.J.; David W. Lewis, Newtown, Pa.

[73] Assignee: Mobil Oil Corporation, New York, N.Y.

[21] Appl. No.: 69,545

[22] Filed: Jul. 2, 1987

[51] Int. Cl.$^4$ .............................................. B01J 10/00
[52] U.S. Cl. .................................... 422/195; 202/158; 203/DIG. 6; 261/97; 422/191; 422/207; 422/220; 422/224
[58] Field of Search .............. 422/195, 207, 224, 310, 422/220, 191; 261/97; 203/DIG. 6; 202/158

[56] References Cited

U.S. PATENT DOCUMENTS

| | | | |
|---|---|---|---|
| 3,353,924 | 11/1967 | Riopelle | 23/288 |
| 3,378,349 | 4/1968 | Shirk | 422/195 X |
| 3,524,731 | 8/1970 | Effron et al. | 23/285 |
| 3,541,000 | 11/1970 | Hanson et al. | 23/288 |
| 4,126,539 | 11/1978 | Derr, Jr. et al. | 208/108 |
| 4,126,540 | 11/1978 | Grossboll et al. | 208/146 |
| 4,140,625 | 2/1979 | Jensen | 208/146 |
| 4,550,000 | 10/1985 | Bentham | 202/158 X |
| 4,579,647 | 4/1986 | Smith | 208/111 |

Primary Examiner—Barry S. Richman
Assistant Examiner—Amalia L. Santiago
Attorney, Agent, or Firm—Alexander J. McKillop; Charles J. Speciale; Malcolm D. Keen

[57] ABSTRACT

A distributor system for use in multiple bed, downflow reactors which provides improved distribution across the reactor and improved vapor/liquid contact and distribution. The system comprises a collection tray arranged below the first catalyst bed in the reactor, a first, rough distributor tray which is arranged below the collection tray and which is fed from the collection tray by means of spillways in the tray and a mixing chamber beneath the spillways. The first distributor tray provides for separate vapor and liquid flow by means of apertures in the tray or downward flow of liquid and vapor chimneys for downward flow of vapor. After the first distributor tray, a second, final distributor tray is provided with downcomers for flow of liquid and vapor onto the lower catalyst bed. Each downcomer comprises an open-topped tube with a side aperture for entry of liquid into the tube, vapor entering through the open top of the tube.

8 Claims, 2 Drawing Sheets

DISTRIBUTION SYSTEM FOR DOWNFLOW REACTORS

FIELD OF THE INVENTION

This invention relates to a distribution system for downflow reactors which include a number of superimposed reaction beds. Reactors of this type are employed in the chemical and petroleum refining industries for effecting various reactions such as catalytic dewaxing, hydrotreating, hydrofinishing and hydrocracking. The present distributor system is particularly useful for effecting mixed-phase reactions between a liquid and a vapor.

BACKGROUND OF THE INVENTION

Reactors used in the chemical, petroleum refining and other industries for passing liquids or mixed-phase liquid/vapor mixtures over packed beds of particular solids are employed for a variety of different processes. Typical of such processes in the petroleum refining industry are catalytic dewaxing, hydrotreating, hydrodesulfurisation, hydrofinishing and hydrocracking. In these processes liquid phase is typically mixed with a gas or vapor phase and the mixture passed over a particulate catalyst maintained in a packed bed in a downflow reactor. Because chemical reactions take place which themselves may produce additional components in the vapor phase, for example, hydrogen sulfide and ammonia during hydrotreating processes, and because such reactions may consume some of the vapor phrase reactants, it is frequently necessary to add additional vaporous reactants e.g. hydrogen at various points along the path of the reactants. Other reactions may use heat exchange media, e.g., hydrogen quench, which are added or withdrawn at different points in the unit. To do this, the contact solid is conventionally arrayed in superimposed beds with a distributor plate above each bed in the sequence to ensure good distribution of the reactant phases at the top of the bed so that flow is uniform across the beds, at least at the top of the bed. By ensuring good reactant distribution, the bed is used most effectively and efficiently and the desired reactions will take place in the most predictable manner with a reduced likelihood of undesirable exotherms or other problem conditions.

Many different types of distribution plate are known. Some are simple and comprise little more than a pierced or slotted plate. Others have various forms of weirs or other devices for promoting the desired uniformity of reactant flow, achieving good liquid/vapor contact. For example, reference is made to U.S. Pat. No. 4,126,539 which shows a distributor plate for use in a catalytic hydrodesulfurisation (CHD) reactor.

One type of system involves an inlet deflector cone cooperating with a splash plate and liquid distributor trough to pass liquid into the reactor to two distributor trays which facilitate the uniform spreading of liquid over the upper face of the catalyst bed. The distributor trays contain a series of spaced risers which have dual functions. They permit vapor to pass down through the tray and they also serve as liquid downflow conduits, the liquid passing through weir slots in the sides of the risers. The nature of liquid flow through weirs, however, makes this type of design very sensitive to tray unevenness introduced during fabrication or installation.

Another example of a distributor is the mixed-phase flow distributor for packed beds of U.S. Pat. No. 3,524,731, which was intended primarily to accommodate wide variations in liquid feed rate. The liquid flow is normally through liquid downpipes but at very high liquid rates, some liquid overflows into the vapor chimneys through triangular weirs. However, during normal operation the chimneys do not carry liquid and hence do not contribute to the number of liquid streams entering the bed. Also, during periods when they carry liquid there would be a a great variation in the liquid flow through the chimneys compared with that through the tubes.

U.S. Pat. No. 3,353,924 shows a somewhat different approach: flow into the liquid tubes is still through a pair of notched weirs and the disadvantages mentioned above are applicable wth respect to this system as well. There is no liquid flow in the vapor chimneys, and the number of uniformly spaced liquid streams which can be placed on the tray is therefore limited.

A system of this kind is shown, for example, in U.S. Pat. No. 4,126,539. Liquid flow is through the vapor downcomers only, by a combination of hole and weir flow. The tray area between the downcomers is not used for liquid distribution, and the use of weir flow makes the distribution pattern vulnerable to variations in tray level.

Other approaches appear in U.S. Pat. Nos. 4,126,540 and 4,140,625 where liquid flow is through holes in downcomers only. There is no attempt to make use of the tray area between downcomers and the size of the downcomers, coupled with the need to maintain tray mechanical integrity, prevents maximization of the number of liquid streams entering the catalyst bed.

Liquid distribution is also of concern in other environments. For example, in U.S. Pat. No. 2,924,441 the disclosure is related to the design of a liquid distributor for gas/liquid phases such as in gas absorption of distillation in a packed tower. The distributor described makes no attempt to address the special need for good initial liquid distribution found in concurrent downflow catalytic reactors.

Another form of distributor is shown in U.S. Pat. No. 3,541,000. The system employs a plate fitted with liquid downcomers which maintain the desired level of liquid above the plate before overflow into each downcomer which also has to allow for the vapor to pass into the bed beneath. This system has two disadvantages. First, the configuration of the top of the downcomers permits considerable variations in the liquid flow rate across the plate unless it is fabricated and installed in a completely horizontal position. The liquid flow rate into the downcomer increases exponentially with the liquid height above the lower edge of the weir and so, if the plate is not horizontal, the greater height of the liquid at one edge of the plate will give a greatly increased liquid flow on the low side of the plate at the expense of the high side. The use of the downcomers for liquid and vapor flow exacerbates this problem since vapor will not flow down through the liquid to a submerged aperture. Thus, if the weirs on the low side of the plate become submerged, not only will the liquid flow increase greatly but vapor flow may be cut off completely. Thus, the desired reactions may be almost completely precluded on at least one side of the reactor bed.

SUMMARY OF THE INVENTION

We have now devised a distributor plate for downflow reactors which provides improved uniformity of distribution across the reactor and improved mixing of liquid and vapor phases. It enables the liquid flow to proceed independently of vapor flow and is relatively insensitive to errors in level. It may therefore be fabricated and installed with greater ease than many other types of distributor.

According to the present invention, the distributor system for use between the beds of a multiple bed downflow reactor comprises (i) a collection tray for receiving vapor and liquid;
(ii) a mixing chamber below the collection tray;
(iii) spillways providing a flowpath for vapor and liquid from above the collection tray into the mixing chamber;
(iv) a first distributor tray at the bottom of the mixing chamber having apertures in it for downward flow of liquid and chimneys for downward flow of vapor, and
(v) a second distributor tray having downcomers for downward flow of liquid and vapor, each downcomer comprising upstanding, open-topped tubes having apertures in their sides for entry of liquid into the tube.

If the distributor system is to be used for a reactor where a vapor is to be injected between the beds, an injection point may be provided either above the collection tray or below it but in order to obtain the best vapor/liuqid contract, it is preferred to have it above the collection tray.

The chimneys in the first distribution tray enable the liquid and vapor flows to be separated at this point so that both proceed at predictable rates. In addition, this tray provides an initial, rough distribution of liquid to the second and final tray which provides for a high degree of flow uniformity across the bed beneath the distributor. The vapor chimneys in the first distributor tray are preferably in the form of open-topped, imperforate tubes which extend upwardly from the first tray to a height which is above the liquid level which will prevail on the first tray. At the top these tubes may be slotted to provide weirs for liquid flow in case the liquid rises to levels higher than normal. The tubes may also be provided with apertured plates across their bottoms with vapor outlets around the bottom of the tubes so as to break up any liquid falling down the chimneys and distribute it across the second distributor tray.

The second distributor tray has a large number of combined vapor/liquid downcomers evenly arrayed across the tray to ensure even distribution across the catalyst bed. These downcomers are in the form of upstanding tubes which extend upwardly from the tray so as to ensure that a pool of liquid is maintained on the tray. Each downcomer tube has an aperture in its side to permit liquid flow into the downcomer. the aperture may be of any convenient configuration—preferably circular—but is preferably dimensioned and positioned so that in normal operation it is below the top of the liquid pool on the tray. This will ensure even, predictable flow into the downcomers. Because the flow into these side apertures is proportional to the square root of the depth of liquid above the aperture, the liquid flow rate into the downcomers is relatively insensitive to variations in liquid height once the apertures are all submerged. For this reason the present distributor system is easier to fabricate and install since it does not need to be absolutely level.

The downcomers preferably have baffles over their open top ends to prevent liquid falling from the first tray directly into the downcomers and so providing unpredictable variations of flow rate. They also preferably are slotted at their upper ends to provide weirs for liquid flow if the liquid level on the tray reaches levels above normal.

The Drawings

DETAILED DESCRIPTION

Figure 1:
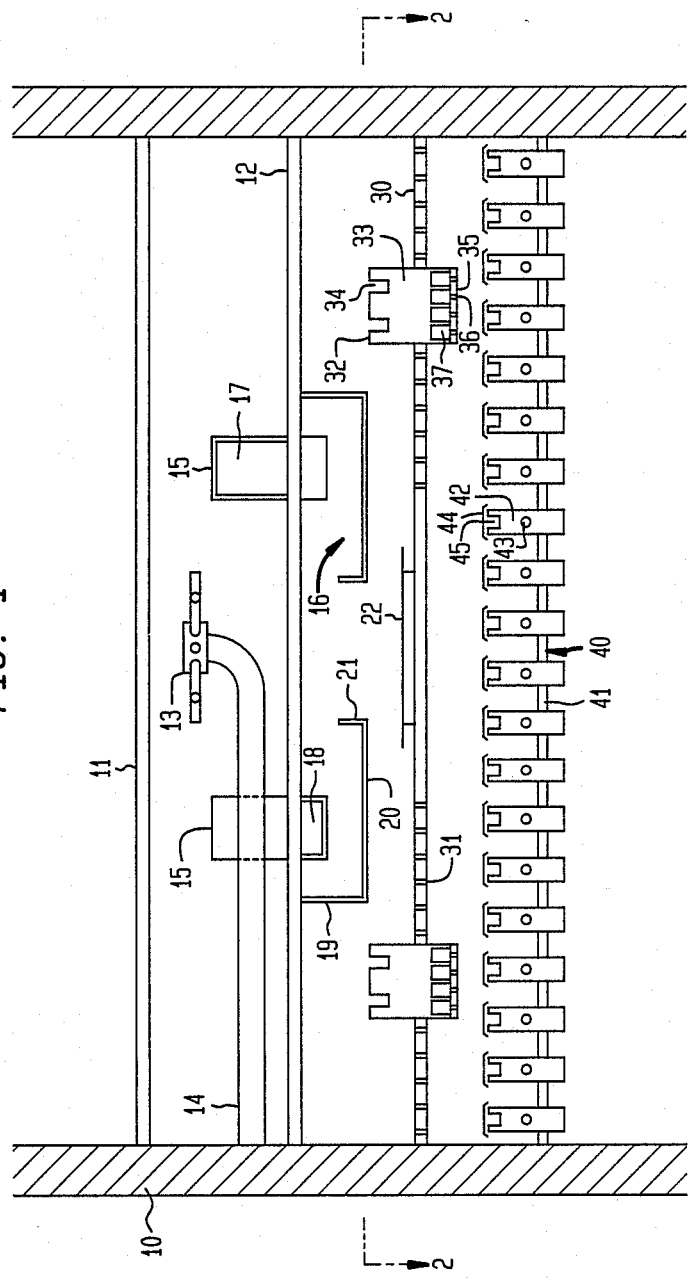
FIG. 1 is a vertical section of a portion of a multiple bed reactor showing the present distribution system.

FIG. 1 shows, in simplified form, a section through the portion of a multiple bed, downflow reactor in the region between the beds. The general configuration of the downflow reactor will be conventional, as will details such as the supports for the grids and distributor plates which are not shown for purposes of clarity. The walls 10 of the reactor and the catalyst support grid 11 support an upper bed of catalyst or other particulate contact solid over which the liquid is to flow together with any vapor included as the reactant or as a product of the reaction. For clarity, the catalyst is not shown. The support grid may be of conventional type and provides support for the catalyst either directly or by means of support balls which permit the liquid and vapor to flow downwardly out of the upper bed of catalyst and through the grid to the distributor system beneath. A collection tray 12 is disposed beneath the catalyst support grid 11 to collect the liquid leaving the upper catalyst bed. The vapor injection point is provided here by means of a spider 13 which is connected to vapor injection line 14 to provide a uniform initial distribution of the injected vapor. For example, in a hydroprocessing reactor such as a catalytic hydrodesulfurization (CHD) unit, hydrogen may be injected as quench at this point. Other vapor injection devices may also be used and if desired, vapor takeoff may also be provided at this level.

A plurality of spillways 15 are provided in collector tray 12 to permit a pool of liquid to accumulate on tray 12 before passing through the spillways into mixing chamber 16 beneath. The spillways comprise upstanding downcomers which provide a passage 17 for the downflowing liquid as well as for the vapor. The spillways have outlets 18 beneath collector tray 12 which face sideways and tangentially into an annular mixing chamber 16. Mixing chamber 16 comprises a cylindrical, vertical wall portion 19 which is fixed to collection tray 12 and a lower, annular tray 20 with an upstanding rim 21 for providing a pool of liquid in the mixing chamber. The side facing outlets 18 of spillways 15 impart a rotary or swirling motion to liquid in mixing chamber 16 which promotes good intermixing and temperature equilibrium of the liquid at this point. The liquid spills over the edge or rim 21 and falls downwards onto the deflector 22 which is disposed directly underneath the central aperture in the annular mixing chamber 16.

Figure 2:
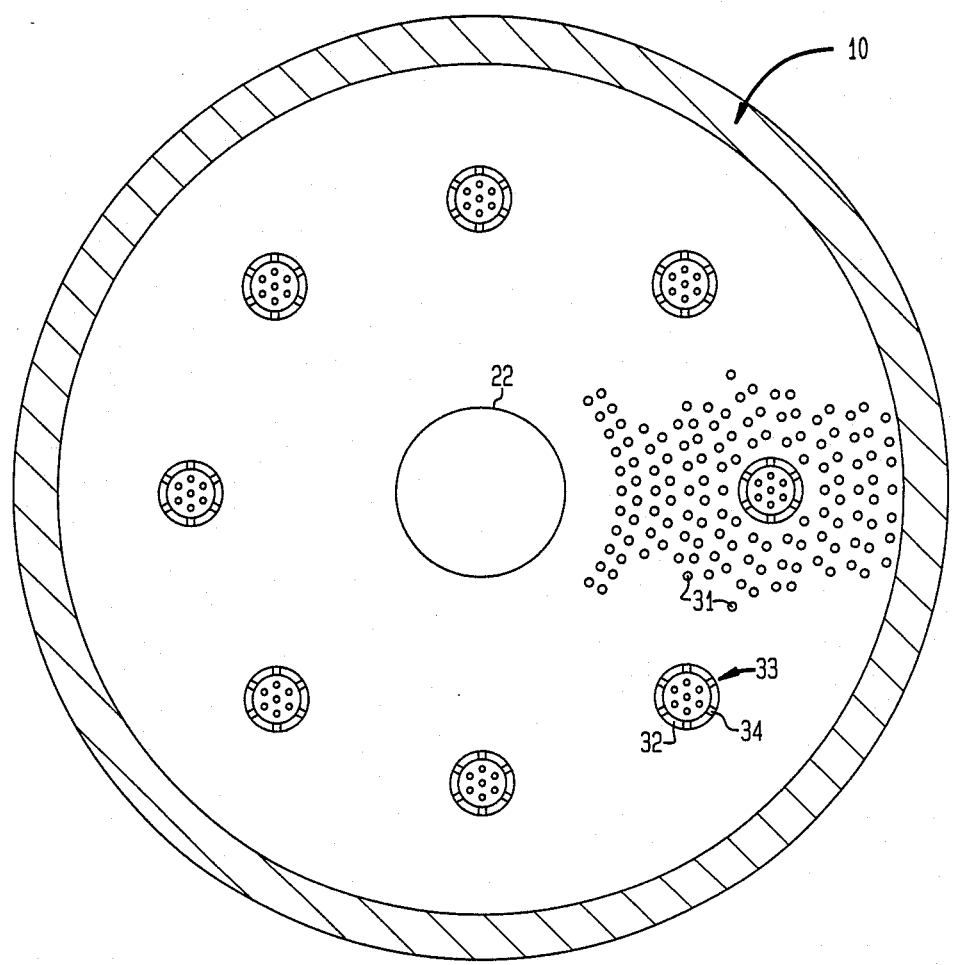
FIG. 2 is a plan view at the 2—2' of FIG. 1.

Deflector 22 is fixed to the first, rough distributor tray 30 which provides an initial, rough distribution of the liquid and the vapor across the reactor. The first distributor plate 30 is provided with a large number of liquid downflow apertures 31 in the region about central deflector 22 (for clarity, only some are shown in FIG. 2). Generally, a pool of liquid will accumulate on tray 20 and cover these apertures so that flow of vapor through them is precluded. To provide for vapor flow into the lower portion of the reactor, a plurality of vapor chimneys 32 is provided, arranged in a ring around the tray, suitably at a point near the circumference of a circle which divides the reactor flow area equally in two. The number of vapor chimneys will be selected according to the desired flow rates and other conditions, as is conventional. The vapor chimneys each comprise an open-topped, imperforate upstanding tube 33 which extends upwardly from the first distributor tray 30. Around the top of each chimney tube a number of slots are provided to act as weirs for liquid flow if the level of liquid on tray 30 should build up to the point where it is necessary to provide for additional flow through the reactor to prevent flooding. The slots may be of any desired configuration, for example, straight-sided, straight-bottomed slots as shown or they may alternatively be arcuate or apertures may be formed just below the top of the chimneys in order to provide for controlled liquid overflow down the chimneys. In order to ensure that any liquid flowing down the chimneys is evenly distributed, the chimneys preferably have distributor plates at their lower ends below tray 30 formed by plates 35 with liquid apertures 36 formed in them. To permit vapor flow out of the chimneys vapor outlets 37 are provided around the lower end of the chimneys and if large amounts of liquid flow down the chimneys, these outlets will permit liquid flow through them.

The second and final distributor tray 40 comprises a flat plate 41 with a large number of vapor/liquid downcomers to provide many points of distribution of vapor and liquid over the bed of catalyst below (not shown). Each downcomer comprises an upstanding tube 42 which extends upwardly from plate 41. Each tube has an aperture 43 (or apertures) in its side which is positioned below the top of the pool of liquid which forms on plate 41 during normal operation. The number and size of all the apertures in the downcomer are selected according to the desired flow rate and generally, it is preferred for the apertures to be totally submerged so that the greatest uniformity of liquid flow is achieved, regardless of variations in the level of the second distributor plate. As pointed out above, the rate of flow of liquid into each aperture varies in proportion to the square root of the height of liquid above the apertures so that the flow rate into the downcomers is relatively insensitive to variations in the level of the distributor plate 40. However, if the liquid level on this tray falls to the point where the apertures are partly uncovered, variations in the horizontal level of the tray will produce relatively greater variations in flow rate across the reactor. For this reason, operation with the apertures completely submerged is preferably. The downcomers are open at the top in order to permit varpor to enter and pass down into the lower catalyst bed but in order to prevent liquid from the first, rough distributor plate entering the downcomers directly and so providing an unpedictable variation from the design flow rate, baffles 44 are placed over the open tops of the downcomers. In addition, the downcomers have liquid weirs at the top in order to provide for additional liquid flow if the liquid level on the second tray should build up beyond its normal height. As with the vapor chimneys, the weirs may be in any convenient form but are suitably straightforward slotted weirs provided by slots 45. The bottoms of the downcomers are open to permit flow of vapor and liquid into the lower catalyst bed.

The distribution system provides improved injection of quench gas or other vapor into the distribution system, improved mixing of vapor, liquid and injected gas as well as improved distribution across the reactor. This system may also be used with liquid quench with an appropriate injection means in place of the spider. In addition, the system is relatively compact in form and takes up relatively little space in the reactor, as compared to other distribution systems which may provide a similar degree of distribution uniformity. The separate vapor and liquid distribution which occurs on the firsst distribution plate avoid potential problems with two-phase distribution and only at the end of the distribution process is liquid injected into each vapor stream through the vapor/liquid downcomers on the final distribution tray. Furthermore, the system, as described above, is relatively insensitive to tolerance variations introduced during fabrication and provides superior uniformity of distribution and vapor/liquid contact during operation under varying conditions.

This system may also be used without quench injection to provide improved liquid mixing and liquid and vapor redistribution in a long catalyst bed.

We claim:
1. A distributor system for distributing vapor and lqiuid across a downflow reactor, which comprises:
 (i) a collection tray for receiving vapor and liquid,
 (ii) a mixing chamber below the collection tray having a first spillway for the downward passage of vapor and liquid;
 (iii) collection tray spillways providing a flow path for vapor and liquid from above the collectin tray into the mixing chamber;
 (iv) a first distributor tray below the mixing chamber, said first distributor tray having apertures in it for downward flow of liquid and vapor chimneys for downward flow of vapor, each vapor chimney comprising an open-topped tube extending above the first distributor tray and including an apertured plate at its lower end below the first distributor tray with vapor outlets arranged around the lower end of the chimney; and
 (v) a second distributor tray having tubular downcomers for downward flow of liquid and vapor, each downcomer comprising upstanding, open-topped tubes having apertures in their sides for entry of liquid into the tube.

2. A system according to claim 1 which includes means for injecting a gas above the collection tray.

3. A system according to claim 1 in which the collection tray spillways comprise upstanding flow conduits extending above the collection tray and defining inlets for vapor and liquid above the collection tray to pass through the tray to the mixing chamber below the collection tray.

4. A system according to claim 3 in which the mixing chamber comprises an annular mixing chamber and said first spillway is centrally located therein.

5. A system according to claim 4 in which the outlets of the collection tray spillways are arranged to discharge tangentially with respect to the mixing chamber to impart a swirling motion to liquid in the mixing chamber.

6. A system according to claim 1 in which the downcomers of the second distributor tray comprise open-topped tubes having baffles over the open tops to deflect and prevent falling liquid from entering the tubes.

7. A system according to claim 1 in which the apertures in the sides of the open-topped tubes of the downcomers are circular.

8. A system according to claim 7 in which the tops of the circular apertures are below the operating height of the liquid on the second distributor tray.

* * * * *